US009551791B2

United States Patent
Van Den Bossche et al.

(10) Patent No.: US 9,551,791 B2
(45) Date of Patent: Jan. 24, 2017

(54) SURROUND SENSING SYSTEM

(71) Applicant: XENOMATIX NV, Leuven (BE)

(72) Inventors: Johan Van Den Bossche, Linden (BE); Dirk Van Dyck, Aartselaar (BE)

(73) Assignee: XENOMATIX NV, Leuven (BE)

( * ) Notice: Subject to any disclaimer, the term of this patent is extended or adjusted under 35 U.S.C. 154(b) by 0 days.

(21) Appl. No.: 14/770,352

(22) PCT Filed: Jul. 9, 2014

(86) PCT No.: PCT/EP2014/064769
§ 371 (c)(1),
(2) Date: Aug. 25, 2015

(87) PCT Pub. No.: WO2015/004213
PCT Pub. Date: Jan. 15, 2015

(65) Prior Publication Data
US 2016/0018526 A1    Jan. 21, 2016

(30) Foreign Application Priority Data

Jul. 9, 2013 (EP) ...................................... 13175826
Feb. 25, 2014 (EP) ...................................... 14156673
Jun. 18, 2014 (EP) ...................................... 14173065

(51) Int. Cl.
| G01C 3/08 | (2006.01) |
| G01S 17/93 | (2006.01) |
| G01C 7/04 | (2006.01) |
| G01S 17/48 | (2006.01) |
| G01S 7/48 | (2006.01) |
| G01S 7/481 | (2006.01) |
| G01S 17/89 | (2006.01) |

(52) U.S. Cl.
CPC ............... *G01S 17/936* (2013.01); *G01C 7/04* (2013.01); *G01S 7/481* (2013.01); *G01S 7/4802* (2013.01); *G01S 7/4808* (2013.01); *G01S 17/48* (2013.01); *G01S 17/89* (2013.01)

(58) Field of Classification Search
CPC ....... G01S 17/936; G01S 17/89; G01S 7/4808
USPC ...................................... 356/3.11, 5.03, 5.04
See application file for complete search history.

(56) References Cited

U.S. PATENT DOCUMENTS

| 4,757,200 A | 7/1988 | Shepherd |
| 5,040,116 A | 8/1991 | Evans, Jr. et al. |
| 8,320,621 B2 | 11/2012 | McEldowney |

(Continued)

OTHER PUBLICATIONS

International Search Report (ISR) dated Dec. 1, 2014, for PCT/EP2014/064769.

(Continued)

*Primary Examiner* — Mark Hellner
(74) *Attorney, Agent, or Firm* — Bacon & Thomas, PLLC

(57) ABSTRACT

A system for detecting the profile of an object. The system having a radiation source for generating a radiation pattern. The system also having a detector which has a plurality of pixels and a processor for processing data from the detector when radiation from the radiation source is reflected by an object and detected by the detector. The system also has a synchronization device for interfacing between the detector and the radiation source. The radiation source is designed for operating in pulsed mode and the synchronization device can synchronize the pulses of the radiation source with the sampling of the detector.

21 Claims, 2 Drawing Sheets

(56) References Cited

U.S. PATENT DOCUMENTS

| | | |
|---|---|---|
| 2002/0196424 A1* | 12/2002 | Sano .................. G01C 3/08 356/4.01 |
| 2004/0119838 A1 | 6/2004 | Griffis et al. |
| 2005/0195383 A1 | 9/2005 | Breed et al. |
| 2007/0177011 A1 | 8/2007 | Lewin et al. |
| 2012/0033196 A1 | 2/2012 | Vanek et al. |
| 2012/0038903 A1 | 2/2012 | Weimer et al. |
| 2012/0181650 A1 | 7/2012 | Mase et al. |
| 2012/0203428 A1 | 8/2012 | Choi et al. |
| 2013/0128257 A1 | 5/2013 | Stettner et al. |

OTHER PUBLICATIONS

Written Opinion dated Dec. 1, 2014, for PCT/EP2014/064769.
International Preliminary Report on Patentability (IPRP) dated Jul. 17, 2015, for PCT/EP2014/064769.
Kaminski et al., "A Sub-Pixel Stereo Vision System for Cost-Effective Intelligent Vehicle Applications", Intelligent Vehicles '95 Symposium, Proceedings of the Detroit, MI, USA Sep. 25-26, 1995, New York, NY, USA, IEEE, US Sep. 25, 1995, p. 7-12.
European Search Report dated Jan. 21, 2014, for EP 13175826.

* cited by examiner

SURROUND SENSING SYSTEM

FIELD OF THE INVENTION

The invention relates to the field of characterising a scene or part thereof. More specifically it relates to systems and methods for detecting the characteristic, e.g. a profile or property, of an object or person, in particular in the vicinity of a vehicle.

BACKGROUND OF THE INVENTION

There are a large number of applications where knowledge of the 3D profile of an object is relevant. Different techniques exist for scanning the profile of an object. Basically they can be subdivided into radar based systems, ultrasound based systems and optical sensing systems.

Radar based systems have the advantage that they can sense a long range but have the disadvantage that they have a poor angular and depth resolution with regard to certain applications (e.g. for tracking the profile in a road).

Ultrasound based systems can be useful for short range sensing but their narrow bandwidth limits the depth sensitivity and the sampling resolution and the strong absorption in air limits the range to a few meter.

Optical sensing based methods can be subdivided in different types measuring the distance through time of flight measurements or by triangulation.

In time of flight methods the object is illuminated by a light source. From the delay between the emission and the detection the distance travelled by the light can be determined. The time of flight methods can make use of pulsed illumination.

In triangulation based systems, the unknown position of an object is calculated using trigonometry. An example of such a system is the Kinect system of Microsoft described in U.S. Pat. No. 8,320,621. In this system structured infra-red light (e.g. circles) is projected and viewed with a 3D camera. This system, which is primarily intended for indoor gaming and entertainment applications, is not suitable for outdoor use, due to the intensity of the sunlight.

In stereovision the distance to an object is determined from the local shift between corresponding parts in the images obtained by two cameras under different viewing angles or by one stereo camera with two lenses. Stereovision based systems can make use of existing set-ups and algorithms from robot vision, can operate using ambient illumination, and do not require projection. On the other hand stereovision based systems have the disadvantage that calibrated cameras with sufficient distance are required. Furthermore, sufficient structure in the images is required to enable cross correlation for parallax, it is difficult to detect flat surfaces and water, a sufficient number of pixels is required, the depth sensitivity is limited, and the cameras used should have a large dynamic range to cope with various light conditions. The biggest hurdle seems to be that stereovision based systems cannot work if there is insufficient structure in the object being scanned.

Therefore there is still room for improvement of surround sensing scan systems that can be used in outdoor situations scanning the profile of objects over a large range with a high resolution and with a high speed.

SUMMARY OF THE INVENTION

It is an object of embodiments of the present invention to provide good systems and methods for determining the profile of an object.

It is an advantage of embodiments of the present invention that it is robust against the variation in light conditions that can occur in an outdoor environment, such as daylight and/or rain. Moreover, it is an advantage of embodiments of the current invention that it is robust against the light of other vehicles.

It is an advantage of embodiments of the present invention that scanning is possible over a range from 1 to 15 m, in some embodiments even over a range from 1 to 30 m, and in some embodiments up to 200 m. By providing ranges up to 200 m, embodiments of the present invention are particularly suited for use in autonomous vehicles. The maximal range can be improved by using better cameras and lasers. Use can be made of the benefits of using semiconductor technology for manufacturing such components. The profiling precision is depending on the range to be scanned. In embodiments according to the present invention, a precision of $\frac{1}{1000}$ of the range can be obtained.

Precision here means precision in distance between the car and the road. The vertical precision "local height of the road" can even be 10 times better.

It is an advantage of the embodiments of the present invention that a viewing angle of 1 radian horizontally and 1 radian vertically can be obtained. Depending on the application, one can choose for different horizontal and vertical angles. Furthermore, if larger viewing angles are required, more systems can be combined.

It is an advantage of embodiments of the present invention that they are robust against vibrations. It is an advantage of embodiments of the present invention that components used in systems according to embodiments of the present invention typically have a long lifetime.

It is an advantage of embodiments of the present invention that the average radiation power is below 1 mW per spot. In case a radiation pattern of 100×100 spots is used this results in an overall average radiation of 10 W. The power threshold is in agreement with commonly applied safety regulations. Furthermore, it is an advantage of embodiments of the present invention that the power consumption of systems according to embodiments of the present invention is low. This is of particular importance in a vehicular environment, where the vehicle's power system must not be overly burdened by the sensing system.

It is an advantage of embodiments of the present invention that they can be easily installed and that the alignment is easy and may even be automated. The initial alignment can e.g. be done by scanning a flat plane and recording the positions of the projected spots as initial reference. A possible change in relative position between projector and detector can easily be detected by observing the projected pattern as a whole.

It is an advantage of embodiments of the present invention that a low-weight and compact system can be provided. It is an advantage of embodiments of the present invention that a low cost system can be obtained, as e.g. it can be based on components that can be made using standard processing techniques. It is an advantage of at least some embodiments of the present invention that no mechanical scanning of the object under study is required resulting in a mechanically less complex system. It thereby is an advantage that the basic components can be available components such as for example CMOS and CCD cameras and laser arrays. These components are readily available.

When multiple cameras are used in a system, use can be made of one or more radiation splitter such as a semi-transparent mirror, a beam splitter, a beam splitting cube, etc. for aligning the different cameras.

For the basic components such as CMOS and CCD cameras and laser arrays we profit for the steady increase in performance and decrease in cost.

It is an advantage of embodiments of the current invention that the performance is scalable.

It is an advantage of embodiments of the present invention that the system's design and component selection can make it reliably functioning independent of the weather conditions, e.g. whether the system is functioning at night, in rain, in fog, independent of the road quality, independent of the used surface material, etc. Systems according to embodiments of the present invention are very robust providing reliable operation in many different environmental conditions. Operation may be substantially independent of the road surface, the material type, the weather, day or night, etc.

It is an advantage of embodiments of the present invention that the sensed and/or processed data is used for saving energy and/or optimizing use of energy in the characterization system, e.g. the active suspension system.

Without changing the basic principles of the method the performance is increased by just using newer versions of camera and lasers. For instance in 3 years CMOS cameras increase from 1 megapixel to 4 megapixel and the same cost.

There are different tradeoffs that can be tuned depending on the application requirements (e.g. tradeoff between power and field of view), resulting in optimum characteristics for particular applications.

In at least some embodiments according to the present invention, the object for which a characteristic, e.g. a profile or property, is to be determined is the road in front of a vehicle. In some embodiments according to the present invention, information of the road in front of the vehicle is used for controlling the suspension system of the vehicle. It is an advantage of embodiments of the present invention, specifically when applied in automotive applications, that they are still working up to speeds of 50 m/s.

It is an advantage of embodiments of the current invention that besides information of the monitored object such as a profile, also several other parameters can be derived. For example, when applied in an automotive environment, also the 3D orientation of a car, the speed of the car, the presence of approaching cars or other objects, the presence of water on the road surface, etc. can be obtained.

The above objective is accomplished by a method and device according to the present invention.

The present invention relates to a vehicle-mountable system for detecting a characteristic of an object, the system comprising: a radiation source adapted to generate a simultaneously pulsed radiation pattern composed of radiation spots; at least one detector having a plurality of pixels; a processor adapted to process data from the at least one detector when radiation from the radiation source is reflected by an object and detected by the at least one detector; a synchronization means interfacing between the at least one detector and the radiation source; wherein the synchronization means is adapted for synchronizing the at least one detector with the radiation source so that detection by the detector of radiation to be processed is detected only during the radiation pulses, and the processor is adapted for determining a characteristic of the object by determining a displacement of detected spots detected with the at least one detector with reference to predetermined reference spot positions.

The predetermined reference spot positions may for example be determined in a calibration phase. The pulsed nature of the pattern implies that the radiated spots are intermittently switched on and off. The duration of the "on" phase may be much shorter than the pulsation frequency. For example, the pattern may be switched on every 16.6 ms (60 Hz frequency), but the duration of illumination within each period may be an order of magnitude shorter. The radiation source may be composed of a plurality of devices.

The determining of the displacement may be performed with sub-pixel accuracy by multipixel fitting the detected spots.

The radiation source may emit monochromatic light and the at least one detector may be equipped with a corresponding spectral filter. Monochromatic light is understood to include laser light as produced by common semiconductor laser devices.

In particular, the spectral filter may be a narrow bandpass filter equipped with optics arranged so as to modify an angle of incidence onto said narrow bandpass filter, to confine said angle of incidence to a predetermined range around a normal of a main surface of said narrow bandpass filter. This angular range may be 9°.

The monochromatic light may have a wavelength spread of less than ±5 nm, preferably less than ±3 nm, most preferably less than ±1 nm.

The radiation source may be adapted to generate laser light in the spectrum of 700-1500 nm, preferably 800-1000 nm.

The radiation source may be adapted to project light at an intensity of at least 100 W/m$^2$, preferably at least 500 W/m$^2$, and is operated at a pulse width and a pulse frequency which are determined so as to keep the average emitted power per spot below 1 mW. The relevant light intensity is the intensity at the intersection of the object and the emitted light. It is an advantage of this embodiment that the brightness of the projected spots exceeds the expected brightness of sunlight. The stated intensity criterion is preferably met up to a range of 30 m when projecting obliquely downwards (for road inspection) and preferably up to 200 m when project forward (for obstacle detection).

The radiation source may comprise a VCSEL array with a low beam divergence, the VCSEL array being configured to simultaneously transmit individual spots of the radiation pattern.

In particular, the system may further comprise micro array optics configured to focus and/or orient each laser spot of the VCSEL array.

The at least one radiation source may comprises at least one laser radiation source for generating laser spots constituting the pulsed radiation pattern.

The processor may be adapted for processing the detected data based on triangulation.

The at least one radiation source may comprise a phase grating for simultaneously generating the combination of radiation spots. It is an advantage of embodiments of the present invention that efficient phase gratings can be obtained, the gratings comprising a system of grooves with a specific depth in a specific transparent material. In an advantageous embodiment, a set of horizontal and vertical grooves can be applied. The design furthermore is flexible so that it can be optimized with respect to the target specifications. The phase grating may be a discrete phase grating such as but not limited to a dammann grating.

The at least one radiation source may be constructed to generate the radiation pattern as a combination of radiation spots and whereby groups of the radiation spots are generated sequentially in time.

The at least one radiation source may comprise a MEMS-scanner. The detector may comprises a MEMS-scanner and the system may comprise a synchronization device for synchronizing the MEMS-scanner of the radiation source with a MEMS-scanner of the detector.

The system may comprise a shutter whereby the shutter, when closed, blocks radiation from arriving at the detector and whereby the synchronization means is adapted for synchronising the pulses of the at least one radiation source with the opening and closing of the shutter.

The obtained data can be used as an input for a more refined model based fitting of a characteristic, e.g. a profile or property, of the road or object, such as spline fitting and even to more sophisticated models for the motion of the object.

The at least one radiation source may be conceived for generating monochromatic radiation in the near infrared spectrum.

The at least one radiation source may comprise a semiconductor laser.

The at least one radiation source may comprise a single VCSEL source or a VCSEL array.

The at least one detector may be a CMOS or CCD sensor.

The system may comprise a small band spectral filter positioned in front of the camera.

The at least one detector may be a plurality of detectors, e.g. two detectors or more detectors. In addition to the triangulation principle based on a single detector, embodiments of the present invention also may make use of a parallax between different detectors. Furthermore embodiments of the present invention optionally also may be combined with stereovision.

The at least one radiation source and the shutter may be adapted for pulsing with pulse widths in the microsecond range.

The system may comprise an interface for outputting obtained information.

The system may further comprise means for modifying an intensity of respective ones of said radiation spots in function of their distance from said system so as to equalize their perceived intensity, the means operating in conjunction with said radiation source or with said at least one detector. It is an advantage of such embodiments that clipping (detector saturation) of the detected spots can be avoided (for the spots that would otherwise have the highest intensity), such that the accurate spatial detection of the spot is not impaired (in particular, the image size analysis using multipixel fitting). In particular, the means for modifying the intensity may comprise an aperture placed in the optical path of said at least one detector, the aperture having an asymmetric shape relative to any horizontal plane. Hence, the aperture is a non-symmetrical lens pupil that modulates the intensity of the received light in function of its angle of incidence, such that reflections from a nearby road area are more strongly attenuated relative to reflections from far away areas. Additionally or alternatively, the projector may project blocks of spots or individual spots with mutually different intensities, or different duration, so as to reduce the intensity or duration of nearby spots relative to far-away spots. Additionally or alternatively, the processor may perform software-based post-processing to remove the effects of clipping (saturation) from the detected spot profiles.

The system may further be adapted to perform the detecting in a range between 1 m and 30 m. This is the range that is preferably covered for the purpose of inspecting the road profile.

The system may further be adapted to perform the detecting in a range between 0 m and 200 m. This is the range that is preferably covered for the purpose of detecting obstacles and/or when the system is applied in autonomous vehicles.

The present invention also relates to a vehicle with controllable suspension, the vehicle comprising a system as described above, a suspension system, and a control system, whereby the control system is adapted for receiving profile information of the system for determining a characteristic of an object and is adapted for using the characteristic, e.g. a profile or property, of the object for controlling the suspension system.

The present invention also relates to a camera, the camera comprising a system as described above whereby the system is adapted to add 3D information to the camera image making it possible to create a 3D image.

The present invention furthermore relates to a method for detecting a characteristic, e.g. a profile or property, of an object, the method comprising emitting a pulsed radiation pattern on the object using at least one radiation source, detecting the reflected pattern using at least one detector having a plurality of pixels, whereby the detection is synchronized with the pulsed radiation pattern, and processing the data from the at least one detector for determining a characteristic of an object.

The present invention also relates to the use of a system as described above for detecting a characteristic of an object in a vicinity of a vehicle, the use taking place in an outdoor environment. In particular, the use may be for measuring a characteristic, e.g. a profile or property, of the road in front of a car, or for controlling autonomous vehicles.

The present invention also relates to a method for detecting a characteristic of an object in the vicinity of a vehicle by means of a vehicle-mounted system, the method comprising: generating a simultaneously pulsed radiation pattern composed of radiation spots, and detecting reflections of said pulsed radiation pattern using at least one detector (102) having a plurality of pixels; wherein: the at least one detector is synchronized with the pulsed radiation pattern so that said detecting takes place during the radiation pulses, and a characteristic of the object is determined by determining a displacement of detected spots with reference to predetermined reference spot positions. The vehicle-mounted system may be externally attached to the vehicle or, more preferably, integrated in the vehicle using existing cavities or newly created spaces for seamless integration.

The present invention also relates to a computer program product comprising code means adapted to cause a processor to perform the determining of said characteristic of the method described above.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
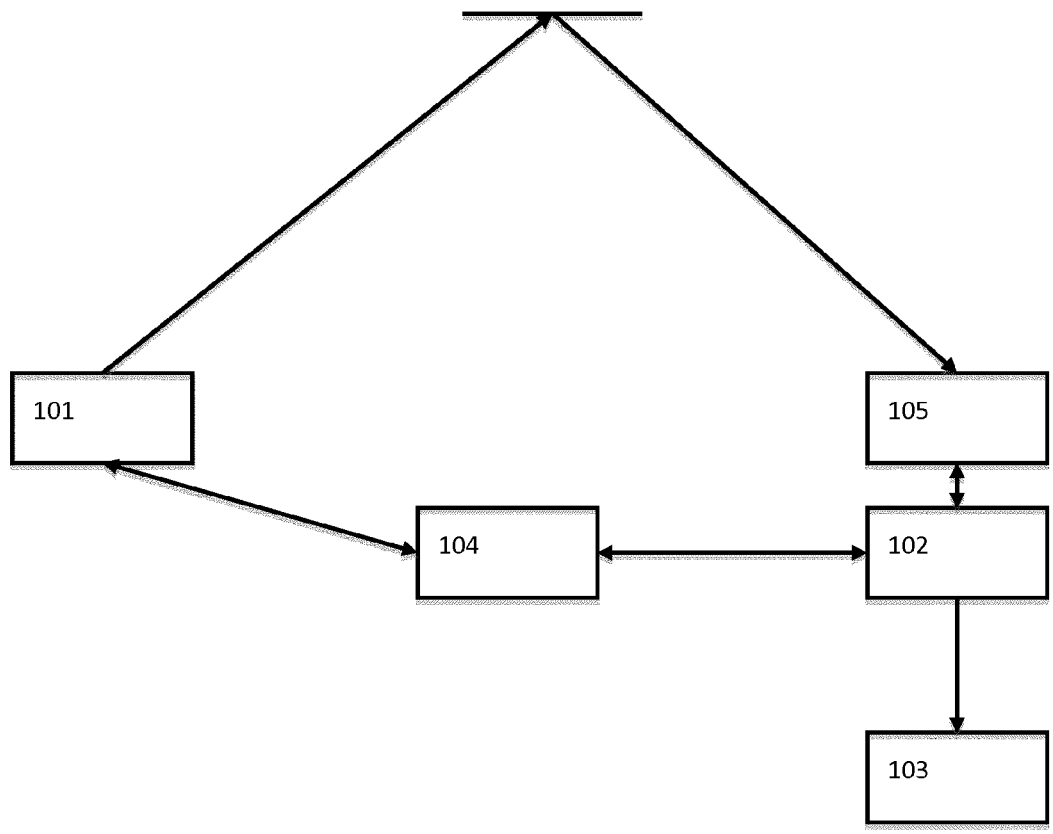
FIG. 1 gives a schematic overview of different components and their interactions in an exemplary system according to embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the current invention reference is made to an object, reference is made to any objects that are stationary or moving relative to the vehicle, which may include the road; road signage; humans using the road as pedestrians, cyclists, etc.; animals; other vehicles; substances on the surface of the road, such as water, sand, mud, leaves, snow, ice, dirt, debris and the like; in agricultural applications, crops, cut grass or hay (baled or loose) on the ground.

Where in embodiments of the current invention reference is made to a vehicle, reference is made to cars, trucks, trains, fork lifts, etc., regardless of whether they are propelled by an internal combustion engine, an electrical motor, or the like, and regardless of the interface with the ground.

Where in embodiments of the current invention reference is made to the near infrared region reference is made to radiation with wavelength between 700 and 1500 nm, in particular between 800 and 1000 nm.

Where in embodiments according to the present invention reference is made to a radiation pattern, the radiation pattern is physically or logically composed of radiation spots characterized by their spot size and intensity. According to the invention, the radiation pattern comprises simultaneously radiated spots or groups of spots, which are turned on and off in a pulsed manner.

Where in embodiments according to the present invention reference is made to triangulation, reference is made to the use of observation of an object under an angle and determining the distance to the spot based on a shift between a reference position and an observed position of a corresponding spot in the image viewed by the camera.

Where in embodiments of the present invention reference is made to a MEMS scanner reference is made to a MEMS scanning micro-mirror whereby the mirror can oscillate in at least one dimension.

In a first aspect, the present invention relates to a system for detecting a characteristic, e.g. a profile or property, of an object. A schematic overview of different components which are comprised in the system according to embodiments of the present invention are illustrated in FIG. 1. FIG. 1 shows a radiation source 101 for generating a pulsed radiation pattern. The radiation pattern advantageously is spot pattern. The system may be mounted at any suitable position. If e.g. the system is mounted to a vehicle, this can be at the top thereof, the side thereof or may be integrated in existing cavities and openings, such as for example in cavities for the head lights or back lights or in the head or back lights themselves, at or near the number plate, etc.

Figure 3:
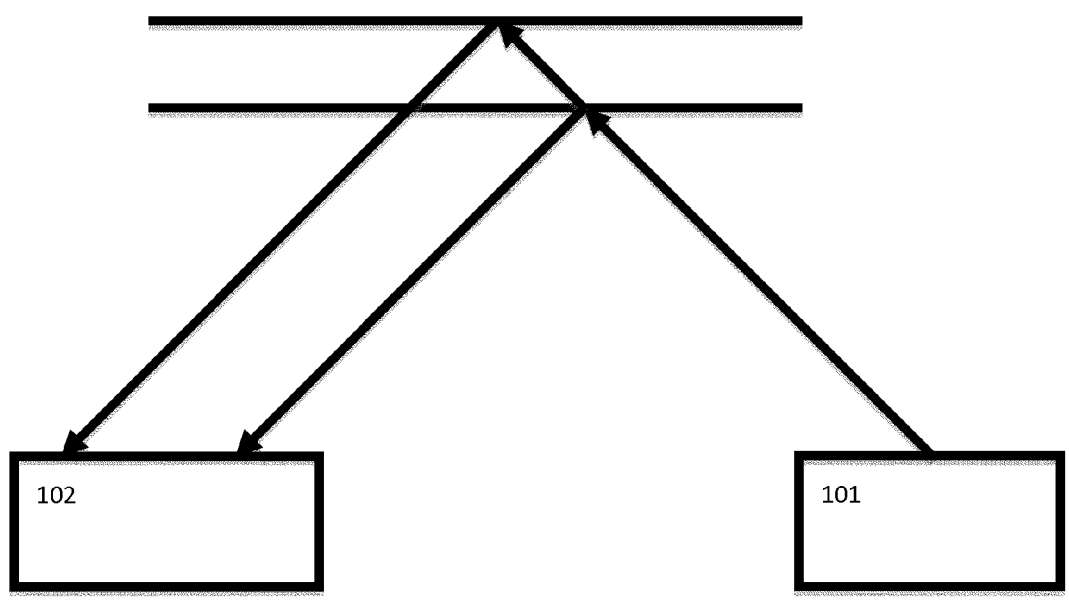
FIG. 3 illustrates a schematic representation of a triangulation principle as can be used in an embodiment of the present invention.

The radiation pattern is reflected by the object under study and captured by a detector 102 also shown in FIG. 1. The radiation source 101 and the detector 102 are synchronized by a synchronization means 104. In embodiments according to the present invention also a shutter 105 might be present whereby the shutter 105 is also synchronized by the synchronization means 104 such that it blocks radiation from the detector 102 as long as no radiation pattern is being transmitted. Alternatively, the detector may be oversampled and only the samples corresponding with time slots wherein pulses are given are considered. Systems according to embodiments of the present invention may comprise one or more radiation sources. The processor 103 in FIG. 1 processes the data coming from the detector 102 thereby revealing profile information of the object under study. The processing advantageously can be based on triangulation. The processor may be adapted for determining a characteristic of an object by determining a displacement of detected spots, the spots being detected with the at least one detector with reference to predetermined reference spot positions. The triangulation principle used in embodiments of the present invention is illustrated by way of example in FIG. 3. The triangulation method used can be based on a single detector, although the invention should not be considered limited to systems comprising only a single detector. In addition to spot shift calculations (triangulation), the system may also analyze the intensity, size, and shape of the reflected spots, to detect further characteristics of the surface from which the spots are reflected.

By way of illustration, embodiments of the present invention not being limited thereto, the different elements of an exemplary system according to an embodiment of the present invention will further be discussed.

In embodiments of the current invention the at least one radiation source 101 is designed to generate radiation, e.g. monochromatic radiation or radiation from a particular wavelength range, in the near infrared region. The near infrared region has the advantage that it is invisible to humans and that CMOS or CCD sensors are still sufficiently sensitive for radiation with a wavelength in this region. In this way, the user is not disturbed by the radiation. The at least one radiation source 101 typically is adapted for extending over the complete object to be monitored. Optical elements therefore may be provided or may be part of the at least one radiation source. In embodiments according to the present invention this object is a viewing scene in front of a car.

The object to be monitored is irradiated using a radiation pattern. In some embodiments according to the present invention this pattern is a regular or irregular array of spots, e.g. sharp spots. The size of the spots may be of the order of 1/1000 of the range. Thus 1 cm at a distance of 10 meter.

According to embodiments of the present invention, the radiation pattern may be a m×n pattern, wherein m is at least 1 and n is at least 1. The spots may be of any geometrical form such as for example an oval, a line, a circle, a disc. The radiation pattern may be regular, i.e. a full matrix, or may be irregular. The radiation pattern may be repetitive, random, etc. The arrangement of the spots in the radiation pattern may be selected as function of the application.

According to embodiments of the present invention, the irradiation is performed during short periods of time, i.e. in a pulsed manner. This has the advantage that a lot of irradiation power can be generated—in pulsed irradiation the momentaneous intensity can be significantly higher than in continuous wave—but that meanwhile the average radiation power can be kept low. In the particular example wherein a spot-like pattern is used for irradiating, the intensity is local on particular positions on the object, which also reduces the total amount of power required by the radiation source 101 to surpass the intensity of the daylight. Advantageously, the spot size may be selected in relationship to the pixel size of the detector 102.

In embodiments according to the present invention irradiation pattern may be induced using laser beams. It is an advantage of embodiments of the present invention that laser beams can yield a very large depth of focus with simple optics.

The irradiation pattern can be irradiated simultaneously. Alternatively, different parts of the irradiation pattern can be irradiated sequentially, such that over time the irradiation pattern is built up, but the irradiation pattern is not provided in a single illumination pulse. According to some embodiments of the present invention, where a plurality of m×n beams is used, the system may be equipped with an optical element, such as for example a prism based microlens, for grouping the beams into an a×b pattern thus increasing the spot intensity at the point of incidence by a factor of a*b compared to a single beam.

Individual parts of the irradiation pattern may be, in one embodiment, may be obtained by positioning a MEMS scanner after the radiation source 101 for deflecting the laser beam in the wanted direction and thus irradiating the object in a scanning manner.

In some embodiments according to the present invention, the irradiation source comprises one or more semiconductor lasers. These semiconductor lasers have a very good cost/performance relationship.

In some embodiments according to the present invention where individual spots of a radiation pattern are transmitted simultaneously different alternatives exist to realize the radiation pattern. A single laser may be used in combination with a diffractive grating for inducing an array of spots. The laser must have sufficient power.

In some embodiments, micro array optics can be used for focusing each laser spot of the laser, e.g. VCSEL.

The peak power of the laser must be sufficient (order of 0.1 to 2 kilowatt) so that the intensity in every spot of the projected pattern surpasses the daylight. For a projected array of 100×100 spots and a range of 10 m the total peak power of the complete laser must be of the order of 250 Watt. But the average (continuous) power of the individual spots may not surpass the safety requirements of 1 mW. Thus for a pattern of 100×100 spots the total average power of the single laser may not exceed 10 Watt. This high peak power versus low average power can be realised by using short pulse times.

Another requirement for practical use is that the electric power of the laser does not exceed 50 Watts. But with an average optical power of 10 watts this requirement can easily be met for semiconductors lasers which have a large efficiency.

In case we use a VCSEL laser array instead of a single laser the power requirements of the single laser have to be met by the array as a whole.

The laser may be a surface edge emitting laser. The irradiation source also may comprise a diffraction grating for generating a grid or other irradiation pattern. Different types of diffractive gratings could be used. For efficiency a phase grating in a transparent material can be used. Ease of manufacturing (simple and cheap) is enhanced if the phase grating has linear grooves in two orthogonal directions. The depth of the grooves typically may corresponds with a phase shift of 180°. The width of the grooves can be calculated such that the intensity envelope matches the required field of view. The FOV of source and detector is both of the order of 1 radian horizontally and 1 radian vertically In other embodiments according to the present invention, where individual spots of the radiation pattern are transmitted simultaneously, a VCSEL array is used as radiation source 101. Such a VCSEL array may be an array with a low beam divergence. The size of the VCSEL may be 10×10, but may be larger. It is an advantage of embodiments using VSCEL arrays that the geometry of the array and the shape of the spots can be tuned depending on the application. The principle may be combined with scanning irradiation as will be discussed later, such that subsequently an array of spots is transmitted.

In some embodiments, at least two radiation sources, also referred to as projectors, may be included, one projector being fixed and another projector being steerable over at least one axis and preferably steerable over two axis for operating in a smaller field of view angle than the fixed projector. The steerable projector may thus be suitable for zooming. Such a function may be used for detecting with more detail certain objects such as for examples holes, birds, children, etc.

The detector 102 may be a CMOS or CCD detector. After the object under study is irradiated by the at least one radiation source 101, the reflected radiation is detected by the detector 102. In order to avoid interference from daylight different precautions can be taken. In embodiments according to the present invention a small band spectral filter can be positioned in front of the detector 102. The small band filter only passes through radiation in the specific wavelength range emitted and blocks the rest of the daylight spectrum.

In embodiments according to the present invention, a synchronization means may be provided that synchronizes the detection with the pulses, resulting in the fact that unwanted irradiation on the detector outside the pulse time of the radiation source can be avoided. This can be implemented in a plurality of ways, e.g. by oversampling by the detector and only taking into account samples wherein a reply on the pulse is expected. Alternatively, a shutter 105 can be used in front of the detector 102. The synchronization means 104 then opens the shutter 105 during the time window the reflected radiation arrives at the detector 102. Therefore the synchronization means 104 gets its synchronization input signal from the radiation source 101. The time window is dependent on the pulse width and on the object range.

In embodiments according to the present invention, the detector 102 optics may be focused to the largest range so as to resolve the spots at that distance and to match it with the pixel size. However because the depth of focus is much smaller than the range, the images of the spots will be broadened at shorter distances. On the other hand the intensity of the spots increases with decreasing distance so that the accuracy in the determination of the position increases. Calculations show that this easily compensates the increased spot size. In embodiments according to the present invention the distance between the spots is chosen such that overlap of spots at the detector (102) side is avoided. In an exemplary embodiment the distance between the spots is equal to ten times the diameter of the spots.

In embodiments according to the present invention the detector 102 may have a number of pixels N×N and the detector 102 optics are selected to match this large number of pixels with the angular resolution (1/N=1 millirad). Moreover the radiation source 101 and accompanying projection optics can be selected to have the same angular resolution (so that the spot size matches the pixel size).

In embodiments of the present invention, large ranges can be bridged. For example radiation spots can surpass the daylight intensity over a large range by a sufficient factor for accurate measurements hereby keeping the individual laser beams below the safety guidelines of 1 mW continuous. Such a range may e.g. be between 1m and 15 m, or even between 1 m and 30 m.

In embodiments according to the present invention, the system also comprises a processor 103 for processing the data received by the detector 102. The detected radiation pattern may for example be analyzed trough triangulation. For example if a spot pattern is used, the spot pattern is observed under a different angle with a detector, e.g. high resolution CMOS or CCD megapixel camera. The distance travelled by a light ray, being part of the radiation pattern, to a particular spot can then be determined by triangulation from the shift between the theoretical and observed position of the corresponding spot in the image viewed by the camera.

The position of a spot can be determined by image processing in which one calculates the weighted center of intensity of the pixels (cfr. center of mass). The calculation of a center of intensity is very simple and can be done in real time with simple and cheap hardware.

If the angular resolution of the radiation source 101 and the detector 102 are worse than 1/N then the observed spot size in the image is larger than one pixel. But since the spot profile is known, one can in principle obtain sub pixel accuracy by multipixel fitting of the whole spot. In an embodiment according to the present invention the theoretical resolution can be calculated using the following formulas. In the embodiment a pattern of light spots is generated by a radiation source 101 and the monitored object is the road in front of a car whereby:

D is the distance between the radiation source 101 and the detector 102

Z is the range over which the road is monitored

N the number of pixels of the detector 102 in both directions

The angular resolution of the projection and of the detection are 1/N

The opening angle of the detector an optional lenses is 1 steradian

H is the height of the projector above the road

The obtainable resolution can be subdivided in:

d: the distance resolution v: the vertical resolution

The theoretical distance resolution can be calculated as:

$$d = \frac{Z^2}{D \cdot N}$$

The theoretical vertical resolution in the profile of the road can be calculated as:

$$v = \frac{Z \cdot H}{D \cdot N}$$

Thus for a 4 Megapixel detector 101 (N=2000) D=2 m H=1 m and Z=20 m a distance resolution of 10 cm (0.5%) and a vertical resolution of 5 mm can be obtained.

At a distance of 1 m the distance resolution is 0.5 mm and the vertical resolution is also 0.5 mm.

As can be seen in the formulas, both the distance resolution and the vertical resolution are inversely proportional to the distance D between the radiation source 101 and the detector 102. Since this distance can be made much larger than the distance between the lenses in a 3D camera, the depth resolution is then also proportionally better for the same illumination.

In one example, a spot profile design is used wherein an interspot distance of 10 spot diameters is present. This then corresponds with a grid of N/10×N/10 spots. For a 1 Megapixel camera the grid then consists of 100×100 points. With a frame rate of 100 Hz we then efficiently sample the road in front of the tires with a vertical resolution of about 1 mm at a lateral sampling distance of 1 cm. The sampling distance in the moving direction depends on the speed of the vehicle.

At the maximal speed of 50 m/sec the sampling distance in the moving direction is of the order of 5 mm. This is quite sufficient for most applications that one can envisage which makes the concept very generic.

The maximal continuous power of 100×100 spots (at the safety level of 1 milliwatt) is then 10 watt which is within all realistic requirements.

In embodiments of the current invention processing the data from the detector 102 can be done on binarized images. It is an advantage of embodiments of the current invention that the required processing power of the processor 103 for processing the data is limited.

For projecting a grid of 100×100 points at a repetition rate of 100 Hz a peak power of the order of 100 Watt and an average power of 10 Watt is required, as also discussed above. A first estimation shows that even with an isotropic reflection coefficient of 1/1000 the total number of detected photons per pixel is above the detection sensitivity of the camera. For triangulation, the radiation source 101, the detector 102, and the object under study form a triangle. The line between the detector and the radiation source 101 is known. The radiation angle is known, allowing to determine distances.

In some embodiments according to the present invention, instead of simultaneously projecting the individual spots of the radiation pattern, the individual spots or groups of spots of the radiation pattern are transmitted sequentially by the radiation source 101.

This can be realized by projecting a pulsed laser beam on a scanner, e.g. a micro-machined scanner, the micro-machined scanner having two degrees of freedom. In embodiments according to the present invention a complete image of 1000×1000 spots can be projected with a repetition rate of up to 30 Hz In one embodiment, at the receiving side, a CMOS or CCD detector 102 captures the pulsed radiation source 101 after it was reflected by the object under study. At the receive side, similar embodiments can be realized as is the case for simultaneous projection of the radiation pattern. The radiation source 101 and the detector 102 are synchronized such that each transmit angle can be associated with a detection spot on the detector 102.

In a second embodiment, the receive side also comprises a micro-machined scanner with 2 degrees of freedom. The scanner can track the reflected radiation, by synchronously moving with the micro-machined scanner at the transmit side.

The radiation captured by the micro-machined scanner is projected on to a photo-detector (an analog linear photosensitive detector). In this way, an optical scanner with a high dynamic range can be realized. A radiation pattern comprising 1000×1000 spots can be transmitted and detected with a repetition rate of up to 30 Hz using such an embodiment.

In embodiments according to the present invention a characteristic, e.g. a profile or property, of the monitored object is determined or reconstructed through triangulation on the received radiation pattern knowing the transmitted radiation pattern. The radiation pattern can be transmitted sequentially or simultaneously. In order to surpass daylight interference the power of the transmitted radiation pattern is increased keeping the average power constant by decreasing the transmitting pulse width.

The following example concerns the application of a system 100, according to an embodiment of the present invention, on a vehicle for monitoring a characteristic, e.g. a profile or property, of the road in front of the vehicle.

To have a large range of visibility the radiation power should be sufficiently high.

For a laserbeam with divergence d the area S of the laserbeam at a distance Z and measured perpendicular to the beam is of the order of $S=(Z*d)^2$. If the projector is positioned at an height H from the road the area of the projected laserspot is $$Sp=(Z/H)*(Z*d)^2$$

For the values Z=30 m, d=1 mrad, H=1 m. Which yields Sp=270 cm$^2$.

A typical value for the power of daylight is 500 Watt/m$^2$ (the actual value depends on the geographical location and atmospheric conditions).

Thus if one wants to surpass the daylight by a factor 5 one needs a power of 2500 Watt/m$^2$. And for an area of 270 cm$^2$ one thus needs an optical power of 67.5 Watt. If we use monochromatic light and a spectral filter, one can gain a factor of 100. Thus one needs an optical power of 0.67 watt per spot (so 0.7 Watt per spot). For safety reasons, the average power of the laser cannot exceed 1 mW. Thus the duty cycle of the laser can not exceed 0.001/0.7=1/700. This can be realized by pulsing the laser in synchronization with the CMOS detector. If we use a CMOS detector at 60 Hz, the frame time is 16 msec. And then the pulse time is 16 msec/700=22 μsec.

For the typical values Z=10 m, d=1 mrad, H=1 m. Which yields Sp=10 cm$^2$.

A typical value for the power of daylight is 500 Watt/m2 (the actual value depends on the geographical location and atmospheric conditions).

Thus if one wants to surpass the daylight by a factor 5 one needs a power of 2500 Watt/m$^2$. And for an area of 10 cm$^2$ one thus needs an optical power of 2.5 Watt. If we use monochromatic light and a spectral filter, one can gain a factor of 100. Thus one needs an optical power of 0.025 watt per spot. For safety reasons, the average power of the laser cannot exceed 1 mW. Thus the duty cycle of the laser can not exceed 0.001/0.025. This can be realized by pulsing the laser in synchronization with the CMOS detector. If we use a CMOS detector at 60 Hz, the frame time is 16 msec. And then the pulse time is 16 msec/0.025=640 μsec.

According to the requirements of the specific application, additional safety margins may be applied, for example a factor 4. Applied to the required minimum intensity of 25

W/m² obtained in the above example, the exemplary safety margin would lead to a requirement of 100 W/m².

The detector 102 only captures incoming radiation when radiation pulses are arriving. Therefore the detector is synchronized with the radiation source 101 through the synchronization means 104.

In case of a camera of 1 Megapixel the number of measurements per second is also of the order of 1 million. When the vehicle moves at a speed of 50 m/s and the road has a width of 20 m the road will be sampled with a resolution of 3×3 cm.

For time of flight based systems, monitoring the same range of 30 m, a radiation beam requires 0.2 µs to travel the whole distance back and forth. During this time the detector 102 is open monitoring the complete field of view. This means that with a fixed average power of 10 Watt illumination over only ¹⁄₁₀₀ of a second is possible. It also means that with a required detector opening time of 0.2 µs only 10000 measurements per second can be achieved. Therefore embodiments according to the present invention can monitor at measurement rates which are a factor 20 better than time of flight based systems.

In some embodiments, the system may be adapted for eliminating or minimizing reflection of sun light and/or for reducing direct reflection of sunlight in reflective surfaces such as water. One or more of the at least one radiation source, the detector and/or the processor may be adapted therefore. In one embodiment, the at least one radiation source may be adapted for generating radiation with one or more predetermined polarization states and the at least one detector may be adapted for receiving only radiation of that one or more predetermined polarization states. The latter may be obtained by providing a polarization filter before the at least one detector for selecting the one or more predetermined polarization states. In another embodiment, the at least one radiation source may be adapted for generating radiation of one or more predetermined wavelengths, which may be in or out of the water spectrum, and the detector may be adapted, e.g. using wavelength filters, to limit the detection substantially to the one or more predetermined wavelengths. Alternatively, these wavelengths may be selected at the level of the processor from images recorded with a larger wavelength spectrum. Another alternative is that the at least one radiation source is not specifically adapted but that the at least one detector filters one or more predetermined wavelengths from the image, which may be in or out of the water spectrum. The filtering also may be performed at the level of the processor from images recorded with a larger wavelength spectrum. In yet another embodiment, the processor used may be adapted for eliminating the daylight or sunlight from a picture by image processing, e.g. by correcting image frame(s) with a fitted reference contribution for daylight/sunlight, thus eliminating the daylight/sunlight.

In some embodiments, the at least one radiation source may be adapted for radiation with at least two different wavelengths thus creating a multispectral radiation source. The latter may be advantageous for detecting certain objects, such as for example detecting organic material, detecting ice, water, snow, etc. Similar as for blocking sunlight, the detector typically also may be adapted with a filter for filtering the corresponding wavelengths emitted by the radiation source to work selectively. In some embodiments, a corresponding filter may be provided for each wavelength. The predetermined wavelengths may be detected each separately or in a single detection. In one embodiment, the processor also or alternatively may be adapted for filtering these wavelengths from an image recorded in a broader wavelength range. The information recorded at specific wavelengths thus may be used for selective detecting certain objects which are more sensitive to these specific wavelengths.

In some embodiments, the system for detecting a characteristic also may be adapted for performing a differential measurement. The system thereby may make use of at least 2 detectors that are spatially distant. The system may be programmed for subtracting images from two different detectors for eliminating sunlight. In one example, one of the detectors could shoot a spotless picture and a second detector could shout a spot based picture, and the pictures may be divided or subtracted to get a differential result. A controller may be present and configured for performing differential measurements. Such a controller may control (e.g. synchronize the image capturing) the at least two detectors and/or the at least one radiation source. An image processor also may be present for processing the images of the at least two detectors to obtain a differential measurement, e.g. subtracting or dividing images. When using differential measurements, simultaneous images are possible recorded by multiple detectors. In this way, identical images can be obtained for subtracting or dividing, whereby in one image the radiation of the radiation source is recorded whereas in the other this is not the case. Another method for differential measurements is based on different wavelength where the projector use bandpass filters based on different wavelengths.

In some embodiments, the processor may be adapted for calculating a relation between consecutive frames. The frames thereby do not need to be directly subsequent frames, in other words, some frames may be skipped. Calculating the relation may be based on correlation, least square fitting, etc. but is not limited thereto. Such a relation may serve to determining a property of the moving object, e.g. vehicle, for example for determining a dynamic property. The relation may for example be used for determining a speed, a pitch, a roll, a yaw, etc. of a moving object. Such a relation also may be used for determining a height measurement of complete surfaces of the object or parts of the object. The object thereby may be in relative movement or may be stationary.

In some embodiments, the processor may alternatively or in addition to other tasks be configured for interpreting image or pixel information for different applications. Such different applications may be—but are not limited to— pavement detection, road detection, road inspection, inspection of the state of the pavement, detection of obstacles such as for example living or non-living creatures, moving or stationary obstacles, etc. Also detection of objects in relationship to their environment may be envisaged.

In some embodiments, the present invention also relates to a system comprising a plurality of systems as described above. The latter may allow to cover a larger field of view. The plurality of systems thereby comprises as much systems as required to cover the field of view one is interested in. The plurality of systems thereby may be mounted such that they cover the field of view of interest. This may be a system that covers 360° horizontally and 180° vertically to obtain surround viewing. Alternatively, any other field of view size may be obtained by appropriately selecting the number of systems and their position. Advantageously, the field of view realized by multiplicating the system at different physical locations may be organized specifically for certain applications such as for example but not limited to autonomous cars, warehouse transport, inspection vehicles, etc. Alternatively or in addition thereto, one or more systems or components thereof may be adjustable to cover different fields of view. The latter may be obtained by making one or more systems moveable to different positions, e.g. to different positions around a car in vehicle applications, by tilting the system under different angles, e.g. change the mounting angle, by making a system steerable, by creating overlap between the system's field of view or a combination thereof.

In some embodiments, the system may be adapted for covering a field of view from near the vehicle to the radar range. Consequently, the system may be combined with radar sensing as to extend the range for certain applications, such as pedestrian detection, collision avoidance or other safety and autonomous vehicle related applications or so as to provide additional and/or complementary measurement data serving the application. More generally, the system can be combined with additional sensors such as radar(s), infrared camera sensor(s), etc. In particular, the system may be used to determine the presence and speed of other vehicles or objects, and that information may in turn be used to control direction and speed of the vehicle, e.g. to avoid collisions, or to maintain a safe and substantially fixed distance to the vehicle ahead (smart cruise control).

In some embodiments, the system may be adapted for performing egomotion related applications. The processor may be adapted to supply data usable for egomotion related applications. The projector, i.e. the radiation source, and/or the detector also may be arranged for creating/recording relevant data for egomotion related applications. In one particular example, egomotion related data may be based on a vehicle's motion based on its motion relative to lines on the road or relative to street signs as observed from the vehicle itself. Egomotion related information may for example be used in autonomous navigation applications.

In some embodiments, the system may be adapted for providing odometry information. The processor may be adapted for determining equivalent odometry information using sequential detector images for estimating distances travelled. The latter may for example be used for enhanced navigational accuracy in robots or vehicles using any type of locomotion on any type of surface.

In some embodiments, a spot pattern may be introduced, whereby some spots, some groups of spots or each spot is addressable and configurable in intensity, spot size, . . . . This allows grouping of spots, introducing irregularities for example in order to render the image processing easier, changing the distance between the lines i.e. making the distance variable, . . . .

In some particular embodiments, the intensity of the VCSEL's may be controlled, such that the spots all have the same shape, the same intensity independent of the distance or the location in the projected spot pattern. The latter enhances the data processing and allows to obtain a more accurate measurement e.g. to avoid clipping of pixel charge and allow multipixel fitting for all spots in the spot pattern. It also allows to fit a curve between profiles that have about the same geometry.

In some embodiments, the radiation source, e.g. VCSEL, may be split in several zones and the different zones may be driven differently to compensate for example for an intensity decrease for spots imaged further away from the source and/or detector. For example, different zones may be driven with a different power or ON time so as to partially or fully compensate for the different intensity loss for the different spots, depending on the position where they are imaged. The latter thus allows that the spots positioned further from the detector are driven at a higher power than the spots closer to the detector. The latter also allows to optimally make use of A/D conversion ranges, where required. In one example, control of one or more spot properties also may be performed for compensating for differently reflecting objects, which otherwise could result in substantially different geometries of the reflected spot. For example, white lines for guiding traffic on the road have a substantially different reflectivity than other parts of the roads. The system can be adapted for compensating geometry changes of the reflected spot caused thereby.

The above control may be referred to as intensity servoing.

In some embodiments, the wavelength of the radiation source used may be controlled (thermal servoing) such that it optimally fits filters, e.g. bandpass filters, used. The wavelength shift may for example be performed using a peltier or heating element. A good fit between the wavelength of the radiation source and the filters used may result in the possibility to reduce and/or minimize the influence of environmental disturbing radiation such as daylight.

In some embodiments, a particular optical or filter design is implemented for allowing the use of a narrow bandpass filter, with a FWHM transmission range between for example 1 nm and 5 nm, or for example 1 nm and 3 nm. The optical or filter design may be adapted for compensating wavelength dependency of the filter caused by the angle of incidence. Several solutions are provided. In a first example, a spherical or spherical-like shape or spherical like dome or spherical like shell optical element with a filter coating is used. Below this spherical or spherical-like shaped optical element, a conventional optical system is positioned allowing imaging on the detector, e.g. CMOS camera. In a second example, optics are provided, comprising conical elements such as array of microlenses or microprisms for orienting the incoming radiation so that the angle of incidence on the filter coating is substantially perpendicular e.g. no more than 9°, and thus the length of the radiation travelled through the filter is substantially equal for all radiation. In a third example, a telecentric lens design is used. These examples all result in radiation travelling a substantially equal length through the filter medium or in other words in that the incident radiation is substantially orthogonal to the filter surface, i.e. it is confined to an angle of incidence within a predetermined range around the normal of the filter surface, thus allowing in accurate filtering within a narrow bandwidth to e.g. filter the daylight, the sunlight and in order to for the spots to surpass the daylight.

In some embodiments of the present invention, the camera, the detector is slightly rotated relative to the projector or vice versa e.g. over an angle of 4°, allowing an improved image processing and facilitating the identification of the spots as the chance of overlap between the segments of the 2D projection on the image sensor of the 3D epipolar lines on which the spots are searched for is reduced.

In some embodiments of the present invention, the type of road can be determined from the spreading of the measured values and from the variation of the intensity, e.g. in a predetermined zone (advantageously the area where the tires will roll).

In some embodiments of the present invention, the intensity of the spots can be kept substantially constant over the full depth range, by applying a stepped or variable attenuation filter at the detector. Alternatively or in addition, also a non-symmetrical lens pupil can be provided for weakening the intensity of spots closer to the detector, while the intensity of the spots further away from the detector are received at full intensity. In this way clipping of the detector is avoided and the average intensity can be made substantially the same for all spots.

In some embodiments, the radiation source can be a VCSEL that can be split in different zones, whereby the laser ON time is controlled for the different zones. The images of the spots can thus be controlled to have a constant intensity, e.g. $\frac{2}{3}^{rd}$ of the A/D range. Alternatively the driving voltage can be driven over the array of spots as function of the height, again to obtain a constant intensity. Such controlling can be referred to as a saturation avoidance servoing loop.

In some other embodiments of the present invention, a micro prism matrix can be used in front of the narrow bandwidth filter, such that the radiation is incident within an angle of incidence between $+9°$ and $-9°$ on the filter. This allows to obtain narrow bandwidth filtering. The prism matrix can for example be made by plastic moulding.

In embodiments of the present invention, e.g. where active suspension vehicle applications are envisaged, the projection of the spot pattern is advantageously directed downwards, i.e. towards the road.

In embodiments of the present invention, advantageously the distance between the detector and the projector is not too small, in order to allow for accurate image processing.

In a second aspect, the present invention relates to vehicles in which the detection system 100 is implemented for monitoring road conditions and as input for controlling the suspension system of the vehicle.

In embodiments according to the present invention, the system for detecting a characteristic, e.g. a profile or property, of an object is placed in front of a vehicle. The object under study is in that case the road in front of the vehicle. Ranges of 1 m to 15 m, even 1 m up to 30 m in front of the car can be monitored.

In advantageous embodiments, the detection system 100 interfaces with the suspension system through an interface or output means. The data may be communicated to a controller for controlling the active suspension system. The result is that the vehicle smoothly moves over the road, also referred to as "flying carpet".

Note that the image of the viewing scene is taken repeatedly with the frame rate of the camera. Thus the characteristic of the road is continuously updated and fed back to the active suspension system.

In one particular example, the controlling may include controlling of the suspension such that the roll vector lies in the same direction as the centrifugal force, so that passengers are pressed against their seats. In another example, the controlling may include active lifting of the chassis of the vehicle when a braking maneuver so that a higher downforce on the vehicle and a higher friction force on the tires is obtained, resulting in a shorter braking distance. Yet another example of controlling is increasing the pitch of a vehicle maximally for collision damage control, resulting in an increased front side of the vehicle for restricting the risk of sliding under a truck. In other circumstances, the controlling may be such that fuel use is minimized by reducing the pitch of a vehicle and thus reducing the air resistance.

In some embodiments, compensation of the active suspension occurs based on the average height in a zone with a surface area as large as the surface of the contact area of the tire on the road. Such compensation may be performed about 50 to 100 ms before the event. The distance of the relevant zone to monitor is a function of the speed of the vehicle. The lateral position (left-right) of the relevant zone is a function of the steering angle. The transformation to be performed for the three degrees of freedom (X, Y and theta) can be identified based on an optimal correlation between two consecutive images. This transformation is then used for determining a new set of height measurements. The roll and/or pitch of the vehicle can be identified based on the 6 degrees of freedom transformation of the coordinate system of the vehicle with respect to a least squares plane fitted through the measurement points. In embodiments according to the present invention, the depth information of the road in front of the car detected by the detection system can be used as a 3D component that can be added to the image of a color camera to render this image into a 3D image.

It is an advantage of embodiments of the present invention that the system can also be used for warning the driver for bad conditions, such as for example rain or snow.

In embodiments according to the present invention, a processor can also be used for deriving the speed of the car from the data coming from the detection system.

In embodiments according to the present invention, the orientation of the car with regard to the road can be derived from the data coming from the detection system. The orientation can then be expressed as the car making an angle with the central line of the road, or in any other suitable way. A processor adapted for deriving such information may be embedded in the detection system or in another system, e.g. control system of the car.

In embodiments according to the present invention the presence and speed of approaching objects can also be detected using the detection system. A processor adapted for deriving such information may be embedded in the detection system or in another system, e.g. control system of the car.

The output of the detection system mounted on a vehicle can thus be used, not only for the suspension system, but as an input for several active components in a car enabling the car to be autonomously controlled.

It is an advantage of embodiments of the present invention that they can be combined with other techniques for extending the possibilities. For example, in one embodiment, the system may be extended with a radar system in order to extend the range that can be monitored.

Generally, when the system according to the invention is mounted to a vehicle, it may be arranged in such a way that the system can move relative to the vehicle, to select a desired field of view. The projector can have angular rotation relative to the detector or vice versa, e.g. over an angle of 4°, allowing an improved image processing and facilitating the identification of the spots as the chance of overlap between the segments of the 2D projection on the image sensor of the 3D epipolar lines on which the spots are searched for is reduced. To obtain a high accuracy in the spot shift analysis more specifically with respect to the vertical resolution, the detector is preferably placed at some distance from the projector. With D is the distance between projector and detector
Z is the range over which eg the road is monitored
θ is the angular resolution (corresponding to a pixel, so for a 1 Megapixel camera and an angle of 1 rad this corresponds to 1 mrad or 1/1000 rad)
H is height of the projector above the object
the distance resolution corresponds to $$d=\theta *Z^2/D$$

and the vertical resolution $$v=d*(H/Z)$$

Thus in the conditions Z=30 m en θ=1/1000 en D=1 m en H=1 m following results are calculated $d = 90$ cm $v = 3$ cm In case Z=10 m other parameters equal $d = 10$ cm $z = 1$ cm In order to realize a vertical resolution of 3 cm at 30 m and 1 cm at 10 m with a 1 Megapixel camera the distance between projector and detector/camera must be 1 m.

Depending on the extent of the field of view required for a particular application, multiple projectors and detectors may be used, whereby ultimately a full 360° viewing angle could be obtained. In view of the scarcity of space for technical components in modern vehicles, the system according to the invention is preferably integrated in the vehicle using existing cavities or newly created spaces for seamless integration.

In a third aspect, the present invention relates to a method for detecting a characteristic, e.g. a profile or property, of an object. Such a method can advantageously be used in combination with a system as described in the first aspect, although embodiments of the present invention are not limited thereto. The method may advantageously be used for determining a characteristic such as a profile of a road. The method may be incorporated in a method for controlling a suspension of a car, the method comprising performing a method for detecting a characteristic, e.g. a profile or property, of a road and a step of using such information for actively controlling a suspension. Nevertheless, the method for detecting a characteristic, e.g. a profile or property, of an object also may be used outside automotive, for any other suitable application.

In a first step 201 a radiation pattern is emitted on the object under study using a radiation source. The radiation pattern can be emitted in one shot (i.e. simultaneously) or sequentially. In any case, the radiation pattern is emitted in a pulsed manner. The latter advantageously results in a better signal to noise resolution, as the amount of power that can be provided during the pulse can be higher, thus resulting in less disturbance of environmental light, such as e.g. daylight.

In a second step 202, the reflected pattern is detected using a detector 102. The detector has a plurality of pixels such that it can detect the complete reflected radiation pattern with a resolution that is sufficient to resolve the pattern. The detection is synchronized with the radiation through a synchronization means 104.

In a third step 203, the data from the detector (102) is processed using a processor (103). Triangulation based methods on the data allow to retrieve profile information from that data. The method may comprise an auto-calibration phase.

Figure 2:
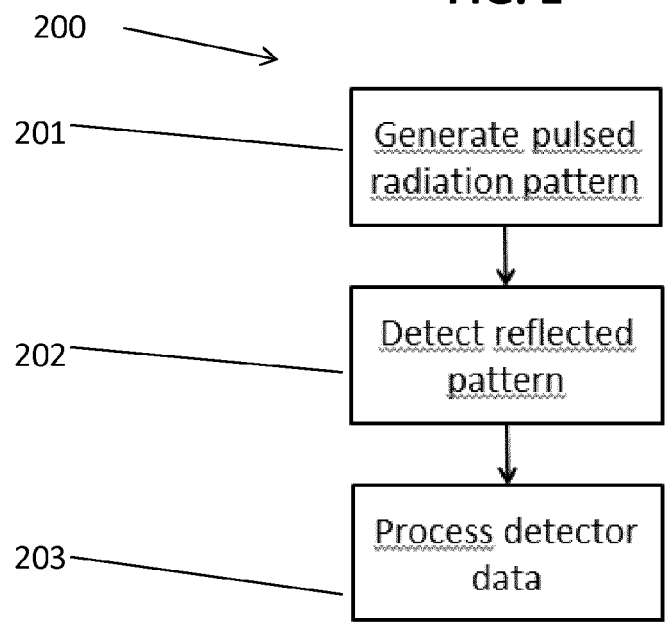
FIG. 2 illustrates a schematic representation of an exemplary method for obtaining a characteristic, according to an embodiment of the present invention.

A schematic representation of a method according to embodiments of the present invention is shown in FIG. 2.

Whereas the above method has been described for detecting a characteristic in an object, e.g. a profile in a road, it will be clear to the skilled person that a number of other applications can be performed using the present system. Particular applications may be based on a particular interpretation of the measured raw data in combination with for example calibration datasets.

In a first example, as discussed in more detail above, the application envisaged is increasing driving comfort. Active suspension is steered based on the obtained measurements to adjust for road imperfections, to adjust for type of pavement, to adjust for road conditions such as ice, water, snow, grind, etc. (this can also be a safety application) to adjust for pitch, roll, etc.

Another example of an application is autonomous or assisted driving of vehicles. The system may for example be used for providing or assisting in a steering function. It may provide steering instructions for semi-autonomous or autonomous steering of vehicles of any means, for example in agriculture, for any type of transport, for road inspection, for a garbage collection truck, for pick and collect tasks in warehouses, for load applications, etc. The system thereby may perform one or more of speed calculation, determination of moving or stationary objects in relation to their environment, etc.

Another example of an application is the provision of safety information or the performance of safety actions. The system may be used for detecting traffic signs, moving objects, vicinity of objects, detection of any moving or stationary object in relation to its environment, road conditions, road types, etc.

Consequently, in one aspect the present invention relates to a method for charactering an object or a scene, the method comprising the steps of emitting a pulsed radiation pattern on the object or scene using at least one radiation source, detecting the reflected pattern using at least one detector having a plurality of pixels, whereby the detection is synchronized with the pulsed radiation pattern for detecting radiation to be processed only during the radiation pulses, and processing the data from the detector for determining a property of the object or the scene. The method further may comprises features and advantages according to methods as described above or expressing the functionality of features of systems as described above.

The invention claimed is:

1. A vehicle-mountable system for detecting a characteristic of an object, the system comprising:
    a radiation source adapted to generate a simultaneously pulsed radiation pattern;
    at least one detector having a plurality of pixels;
    a processor adapted to process data from the at least one detector when radiation from the radiation source is reflected by an obj ect and detected by the at least one detector;
    a synchronization means interfacing between the at least one detector and the radiation source;
    wherein the synchronization means is adapted for synchronizing the at least one detector with the radiation source so that detection by the detector of radiation to be processed is detected only during the radiation pulses,
    wherein the radiation source comprises at least one laser adapted for generating a plurality of laser spots constituting said pulsed radiation pattern,
    wherein the processor is adapted for determining a characteristic of the object by determining a displacement of detected spots detected with the at least one detector with reference to predetermined reference spot positions,
    and wherein said determining of said displacement is performed with sub-pixel accuracy by multipixel fitting said detected spots.

2. The system according to claim 1, wherein the radiation source emits monochromatic light and wherein the at least one detector is equipped with a corresponding spectral filter, and wherein the spectral filter is a narrow bandpass filter equipped with optics arranged so as to modify an angle of incidence onto said narrow bandpass filter, to confine said angle of incidence to a predetermined range around a normal of a main surface of said narrow bandpass filter.

3. The system according to claim 2, wherein said monochromatic light has a wavelength spread of less than ±5 nm, preferably less than ±3 nm, most preferably less than ±1 nm.

4. The system according to claim 1, wherein the radiation source is adapted to generate laser light in the spectrum of 700-1500 nm, preferably 800-1000 nm.

5. The system according to claim 1, wherein said radiation source is adapted to project light at an intensity of at least 100 W/m$^2$ at the intersection of the object and emitted light, preferably at least 500 W/m$^2$ at the intersection object and emitted light and is operated at a pulse width and a pulse frequency which are determined so as to keep the average emitted power per spot below 1 mW.

6. The system according to claim 1, wherein said radiation source comprises a VCSEL array with a low beam divergence, said VCSEL array being configured to simultaneously transmit individual spots of said radiation pattern.

7. The system according to claim 6, further comprising micro array optics configured to focus and/or orient each laser spot of said VCSEL array.

8. The system according to claim 1, wherein the processor is adapted for processing of the detected data based on triangulation.

9. The system according to claim 1, wherein the radiation source comprises a phase grating for simultaneously generating the radiation pattern.

10. The system according to claim 1, the system further comprising a shutter wherein the shutter, when closed, blocks radiation from arriving at the at least one detector and wherein the synchronization means is adapted for synchronizing the pulses of the radiation source with the opening and closing of the shutter.

11. The system according to claim 1, wherein the at least one detector is a CMOS or CCD sensor and/or wherein the system comprises a narrow band spectral filter positioned in front of the camera, and/or wherein the at least one detector is a plurality of detectors the system in addition making use of parallax between the plurality of detectors and/or of stereovision.

12. The system according to claim 1, further comprising means for modifying an intensity of respective ones of said radiation spots in function of their distance from said system so as to equalize their perceived intensity, said means operating in conjunction with said radiation source or with said at least one detector.

13. The system according to claim 12, wherein said means for modifying said intensity comprises an aperture placed in the optical path of said at least one detector, said aperture having an asymmetric shape relative to any horizontal plane.

14. The system according to claim 1, further adapted to perform said detecting in a range between 1 m and 30 m.

15. The system according to claim 1, further adapted to perform said detecting in a range between 0 m and 200 m.

16. A vehicle with controllable suspension, the vehicle comprising a system according to claim 1, a suspension system, and a control system, wherein the control system is adapted for receiving profile information of the system for determining a characteristic of an object and is adapted for using the information for controlling the suspension system.

17. A camera, the camera comprising a system according to claim 1, wherein the system is adapted to add 3D information to the camera image based on information obtained from the system, making it possible to create a 3D image.

18. A method comprising the step:
detecting a characteristic of an object in a vicinity of a vehicle using a system according to claim 1, said use taking place in an outdoor environment.

19. The method according to claim 18, further comprising the step of measuring the profile of the road in front of a car or for controlling of autonomous vehicles.

20. A method for detecting a characteristic of an object in the vicinity of a vehicle, the method comprising:
using a vehicle-mounted system to generate a simultaneously pulsed radiation pattern composed of radiation spots; and
using said vehicle-mounted system to detect reflections of said pulsed radiation pattern using at least one detector having a plurality of pixels;
wherein the at least one detector is synchronized with the pulsed radiation pattern so that said detecting takes place during the radiation pulses,
wherein a plurality of laser spots constitutes said pulsed radiation pattern,
wherein a characteristic of the object is determined by determining a displacement of detected spots with reference to predetermined reference spot positions, and
wherein said determining of said displacement is performed with sub-pixel accuracy by multipixel fitting said detected spots.

21. A non-transitory machine readable data storage storing a computer program product comprising instructions to cause a processor to perform the determining of said characteristic of the method of claim 20.

* * * * *